United States Patent [19]
Hatakeyama et al.

[11] Patent Number: 5,950,924
[45] Date of Patent: Sep. 14, 1999

[54] SUCK BACK VALVE

[75] Inventors: Masatoshi Hatakeyama, Machida; Kenichi Kurosawa, Matsudo, both of Japan

[73] Assignee: SMC Kabushiki Kaisha, Tokyo, Japan

[21] Appl. No.: 09/106,345

[22] Filed: Jun. 29, 1998

[30]     Foreign Application Priority Data

Jul. 17, 1997 [JP] Japan .................................. 9-192539

[51] Int. Cl.[6] .................................................. B05B 15/00
[52] U.S. Cl. ........................ 239/119; 239/75; 239/106; 222/571; 251/63.5; 251/331; 60/326
[58] Field of Search ..................... 239/104, 106, 239/75, 119, 583, 586; 222/571; 251/63.5, 331; 60/326; 188/267; 267/140.14, 140.15

[56]               References Cited

U.S. PATENT DOCUMENTS

| | | | |
|---|---|---|---|
| 2,948,118 | 8/1960 | Carlson, Jr. et al. | 60/326 X |
| 3,895,748 | 7/1975 | Klingenberg | 222/571 |
| 4,394,945 | 7/1983 | Taylor, Jr. | 222/571 |
| 4,597,719 | 7/1986 | Tano | 222/571 X |
| 4,840,112 | 6/1989 | Bhadra et al. | 60/326 X |
| 5,134,962 | 8/1992 | Amada et al. | 222/571 X |
| 5,316,112 | 5/1994 | Kimura et al. | 188/267 |
| 5,386,849 | 2/1995 | Gilchrist et al. | 251/331 X |
| 5,423,482 | 6/1995 | Mueller et al. | 239/119 X |

FOREIGN PATENT DOCUMENTS 8-10399  3/1996  Japan .

*Primary Examiner*—Andres Kashnikow
*Assistant Examiner*—Steven J. Ganey
*Attorney, Agent, or Firm*—Oblon, Spivak, McClelland, Maier & Neustadt, P.C.

[57]               ABSTRACT

A suck back valve is equipped with a displacement speed regulating device made up of an ER (Electro-rheological) fluid filled in a chamber and whose viscosity changes in correspondence with the size of an external electric field, a coil member which generates the external electric field in response to an applied voltage, and a constriction which regulates a flow amount of the ER fluid between an upper-side chamber and a lower-side chamber of the chamber.

7 Claims, 3 Drawing Sheets

SUCK BACK VALVE

BACKGROUND OF THE INVENTION

1. Field of the Invention

The present invention concerns a suck back valve which is capable of preventing liquid drip of a liquid at a supply port, for example, by sucking a predetermined amount of the liquid flowing through a fluid passage under a displacement action of a diaphragm.

2. Description of the Related Art

A suck back valve has hitherto been used, for example, in a semiconductor wafer manufacturing process. The suck back valve, when halting the supply of a coating liquid onto the semiconductor wafer, possesses a function for preventing so-called "liquid drips" wherein minute amounts of coating liquid continue to drip from the supply port toward the semiconductor wafer.

FIG. 3 illustrates a suck back valve in accordance with this conventional technique which may be referred to, for example, in Japanese Utility Model Publication No. 8-10399.

The suck back valve 1 includes a valve body 5 which is formed by a fluid passage 4 intercommunicating a fluid inlet port 2 and a fluid outlet port 3, and a bonnet 6 which is attached to an upper part of the valve body 5. A diaphragm 7 which is constructed from a thick-walled portion and a thin-walled portion, is disposed centrally within the fluid passage 4. A pressurized fluid supply port 8, which is connected to a pressurized fluid supply source 13, and which supplies pressurized air for operating the diaphragm 7 under a switch-over action of an unillustrated directional control valve, is formed in the bonnet 6.

A piston 9 is fitted to the diaphragm 7, the piston 9 having a v-packing 10 attached thereto which is slidable along an inner wall surface of the valve body 5, together with performing a sealing function. Further, a spring 11 which normally biases the piston 9 in an upward direction, is disposed in the valve body 5.

Further, reference numeral 12 shows a screw member which abuts against the piston 9 and functions as a stop for regulating a displacement amount of the piston 9, thereby adjusting a flow amount of coating liquid which is sucked by the diaphragm 7 by increasing or decreasing a screw-in amount thereof.

A coating liquid supply source 14 is connected to the fluid inlet port 2 through a conduit 15 such as a tube or the like. Further, an ON/OFF valve 16, which is constructed separately from the suck back valve 1, is connected between the coating liquid supply source 14 and the fluid inlet port 2. By energization and de-energization thereof, the ON/OFF valve 16 performs a function of switching between a supply state and a supply-halted state of the coating liquid with respect to the suck back valve 1.

Next explaining in outline the operation of the suck back valve 1, in an ordinary state in which a coating liquid is supplied from the fluid Inlet port 2 to the fluid outlet port 3, the piston 9 and diaphragm 7 are displaced downward in unison under an action of pressurized air which is supplied from the pressurized fluid supply port 8. The diaphragm 7 which is connected to the piston 9 projects into the fluid passage 4, as shown by the two-dot-chain line in FIG. 3.

At that point, in the event that the flow of coating liquid inside the fluid passage 4 is halted under a switching action of the ON/OFF valve 16, by terminating the supply of pressurized air from the pressurized air supply port 8, the piston 9 and diaphragm 7 are raised upwardly in unison under action of an elastic force of the spring 11, wherein any coating liquid remaining inside the fluid passage 4 is sucked back under a negative pressure action of the diaphragm 7, thereby preventing unwanted liquid drip from occurring at an unillustrated supply port.

Notwithstanding, with the suck back valve 1 according to the conventional technique, an upper-limit position of the piston 9 which is raised under an action of the elastic force of the spring 11 is regulated by abutment with an end of the screw member which functions as a stop. However, in this case, vibrations are generated as a result of kinetic energy of the piston. Thus, a disadvantage occurs whereby such vibrations are conveyed to the fluid passage 4 and effect the coating liquid which remains in the supply port (not shown), causing unwanted dripping of coating liquid onto the semiconductor wafer.

Further, the suck back valve according to the conventional technique is constructed so that, by raising the piston 9 by action of the elastic force of the spring 11, a fixed amount of coating liquid remaining in the fluid passage is sucked back under a negative pressure action of the diaphragm. Accordingly, the rate of speed at which the piston 9 is raised is set and determined by the elastic force of the spring 11. Thus, for example, a disadvantage results in that the rate of speed at which the piston is raised is not freely controllable corresponding to characteristics of the fluid flowing in the fluid passage 4.

Furthermore, with the suck back valve 1 according to the conventional technique, troublesome pipe-connecting operations are needed between the suck back valve 1 and the ON/OFF valve 16, along with the need for a dedicated space for installation of the ON/OFF valve 16 externally of the suck back valve 1, with the disadvantage that installation space increases.

Still further, fluid passage resistance increases due to the piping which is connected between the suck back valve 1 and the ON/OFF valve 16, resulting in deterioration of the response accuracy (responsiveness) of the diaphragm 7.

SUMMARY OF THE INVENTION

A general object of the present invention is to provide a suck back valve capable of preventing liquid drip caused by unwanted vibrations, by regulating the displacement speed of a piston.

A main object of the present invention is to provide a suck back valve in which pipe connecting operations are made unnecessary, thereby minimizing the required installation space.

Another object of the present invention is to provide a suck back valve which is capable of reducing fluid passage resistance, together with improving the response accuracy of the diaphragm.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
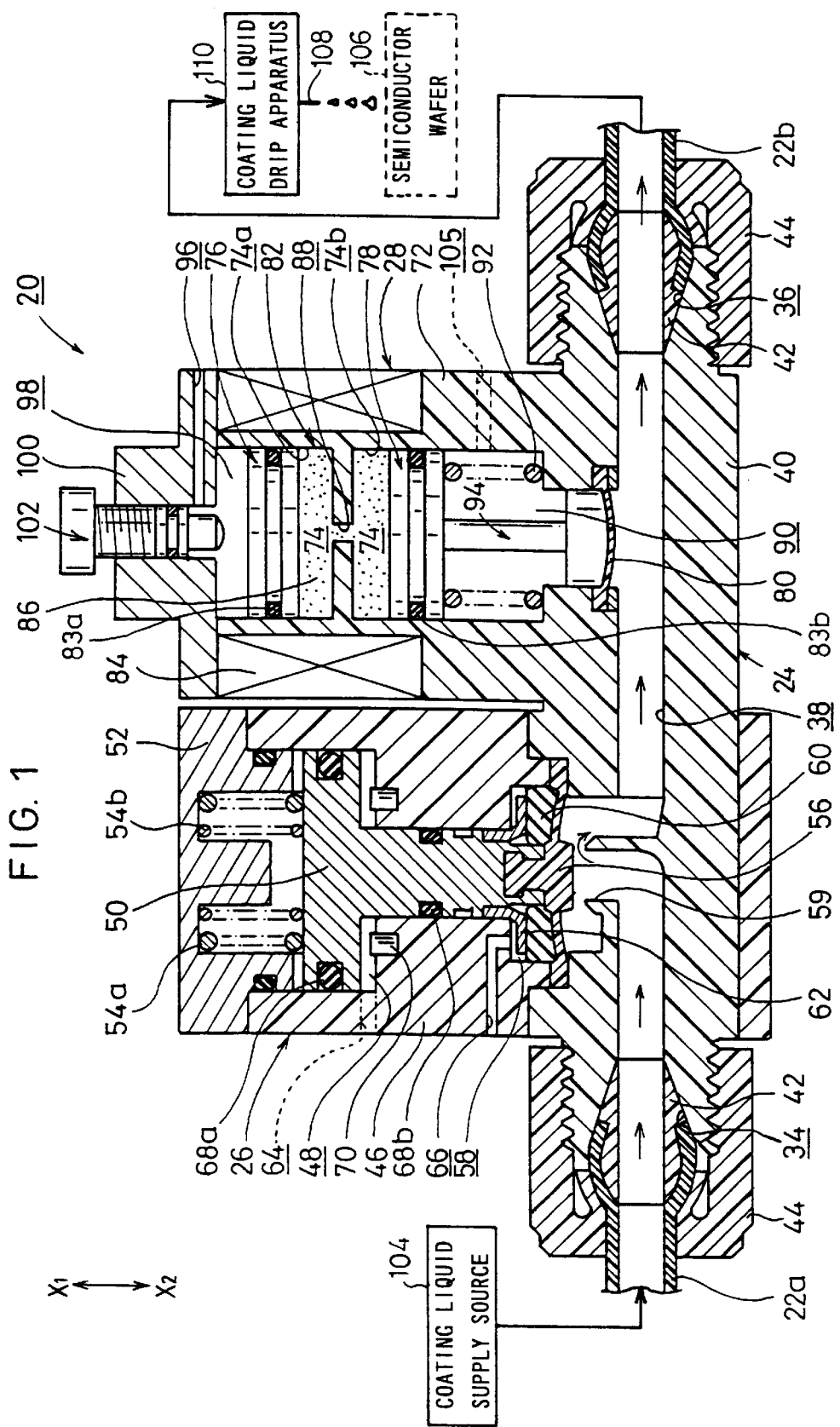
FIG. 1 is a vertical cross-sectional view of a suck back valve in accordance with an embodiment of the present invention.

Referring to FIG. 1, reference numeral 20 shows the suck back valve according to an embodiment of the present invention. The suck back valve 20 includes a coupling 24 to which a pair of tubes 22a, 22b are detachably connected, together with an ON/OFF valve 26 and a suck back mechanism 28 disposed alongside on top of the coupling 24.

The coupling 24, ON/OFF valve 26 and suck back mechanism 28, respectively, are formed together making up an integral unit.

A first port 34 is formed on one end, and a second port 36 is formed on the other end of the coupling 24, the coupling further comprising a coupling body 40 having a fluid passage 38 disposed therein interconnecting the first port 34 and the second port 36, inner members 42 engaging respectively the first and second ports 34, 36 and further which are inserted into openings of tubes 22a, 22b and lock nuts 44 for maintaining fluid-tightness of connecting positions of the tubes 22a, 22b by threading the lock nuts 44 onto screw threads which are cut into respective ends of the coupling body 40.

An ON/OFF valve 26 is arranged on an upper part of the coupling 24 proximate the first port 34. The ON/OFF valve 26 includes a first valve body 46 integrally connected with the coupling body 40, and a first piston which is displaced in directions of arrows $X_1$ and $X_2$ along a first pilot chamber 48 formed in the interior of the first valve body 46.

In this case, a pair of different diameter spring elements 54a, 54b are interveningly arranged between the first piston 50 and a first cover member 52, wherein the first piston 50 is in a state in which it is normally biased downward (direction of arrow $X_2$) due to the elastic force of the spring elements 54a, 54b.

A first diaphragm chamber 58 which is blocked by a first diaphragm 56 is formed at a lower end of the first piston 50. The first diaphragm 56 is connected to a lower end of the first piston 50 and disposed for integral displacement with the first piston 50.

In this case, the first diaphragm 56 is separated from a seat 59 which is formed in the coupling body 40, and further performs a function for opening and closing the fluid passage 38 by seating/unseating thereof onto the seat 59. Accordingly, by opening and closing actions of the ON/OFF valve 26, switching between a supply state and supply-halted state of a fluid (e.g. coating liquid) which flows through the fluid passage 38 can be undertaken.

Further, a ring-shaped protecting member 60 formed, for example, from a rubber material or the like, for protecting a thin-walled portion of the first diaphragm 56, is disposed on an upper surface of the first diaphragm 56, while the protecting member 60 is in turn supported by a cross-sectionally L-shaped support member 62 which is connected to a lower end of the first piston 50.

A first pilot port 64 communicating with the first pilot chamber 48 is formed in the first valve body 46. In this case, under a driving action of an unillustrated pressurized fluid supply source, the first piston 50 is raised in opposition to the elastic for of spring elements 54a, 54b by supplying a pressurized fluid (pilot pressure) to the inside of the first pilot chamber 48 through the first pilot port 64. Accordingly, the fluid passage 38 becomes open by separation of the first diaphragm 56 at a predetermined interval separation from the seat 59, and coating liquid flows from the first port 34 toward the side of the second port 36.

Further, a vent passage 66 communicating the first diaphragm chamber 58 with atmosphere, is formed in the first valve body 46. By supply and discharge of air inside the first diaphragm chamber 58 through the vent passage 66, the first diaphragm 56 can be smoothly operated.

Reference numerals 68a and 68b illustrate seal members fitted around an outer circumferential surface of the first piston 50, for maintaining airtightness of the first pilot chamber 48, whereas reference numeral 70 shows a cushioning member for alleviating shock when the piston 50 is lowered.

A suck back mechanism 28 is disposed on an upper part of the coupling 24 proximate the second port 36. The suck back mechanism 28 includes: a second valve body 72 formed integrally with the coupling body 40; second and third pistons 76, 78 arranged at a fixed interval separation from each other inside of a chamber 74 formed in the interior of the second valve body 72, and being displaceable along the chamber 74 in the direction of arrows $X_1$ and $X_2$; and a displacement speed regulating device 82 for regulating a speed at which the second diaphragm 80 is raised through the third piston 78.

The displacement speed regulating device 82 is constructed by: a coil member 84 which is disposed in surrounding relation to the chamber 74 which is blocked by the second piston 76 and the third piston 78 which are respectively fitted with seal members 83a, 83b on outer circumferences thereof; an ER (Electro-rheological) fluid 86 filling the inside of the chamber 74 and having a viscosity which is greatly changed under an effect of an external electric field generated by the coil member 84; and a constriction 88 disposed at an intermediate position in the chamber 74, which regulates a flow amount of the ER fluid 86 flowing between an upper-side chamber 74a proximate the second piston 76 and a lower-side chamber 78b proximate the third piston 74b.

An electric source (not shown) is connected to the coil member 84 for regulating the size of an external electric field generated by the coil member 84 by means of increasing or decreasing a voltage applied to the coil member 84.

The ER fluid 86 is made up, for example, from a fluid having dispersed phase particles distributed and suspended in an insulating dispersion medium, wherein the rheological or flow characteristics are such that the fluid changes in characteristics of its viscosity/plasticity by changing an externally applied electric field. In general, the ER fluid 86 has a characteristic in which its degree of viscosity is raised remarkably in proportion to the size of an externally applied electric field.

On the lower side of the third piston 78, a second diaphragm chamber 90 is formed which is blocked by the second diaphragm 80 facing the fluid passage 38. A spring element 92 is disposed in the second diaphragm chamber 90, the third piston 78 being normally biased upwardly (in the direction of arrow $X_1$) by an elastic force of the spring element 92.

Further, a stem 94 is disposed in the second diaphragm chamber 90, having one end thereof fixed to a lower portion of the third piston 78 and another end coupled to an upper surface of the second diaphragm 80. The stem 94 is formed for displacement in unison with the third piston 78 along the directions of arrows $X_1$ and $X_2$. Further, a lower end of the stem 94 which engages the upper surface of the second diaphragm 80 is arcuately shaped in cross-section.

A second pilot chamber 98 communicating with the second pilot port 96 is formed upwardly of the second piston 76. The second pilot chamber 98 is hermetically blocked by a second cover member 100. In this case, a stop 102 for regulating a displacement amount of the second piston 76 is disposed in the second cover member 100, wherein by increasing or decreasing a screw-in amount of the stop 102, a displacement amount of the second piston 76 is set.

A vent hole 105 is formed in the second valve body 72 for communicating the second diaphragm chamber 90 with atmosphere.

The suck back valve 20 according to the present embodiment is constructed basically as described above. Next, an explanation shall be given of the operation and effects thereof.

First, the coating liquid supply source 104, storing therein a coating liquid, is connected to the tube 22a communicating with the first port 34 of the suck back valve 20, whereas the coating liquid drip apparatus 110, having a nozzle 108 disposed thereon for dripping of coating liquid toward the semiconductor wafer, is connected to the tube 22b communicating with the second port 36.

Further, an unillustrated pressurized fluid supply source is connected, respectively, to the first pilot port 64 and the second pilot port 96. In addition, the screw-in amount of the stop 102 is increased or decreased so as to adjust beforehand the displacement amount of the second piston 76.

After completion of the above preparatory steps, the unillustrated pressurized fluid supply source is energized, and under a switch-over action of directional control valves (not shown), pressurized fluid (pressurized air) is supplied to the first pilot port 64 and to the second pilot port 96.

Pressurized fluid introduced from the second pilot port 96 is supplied to the second pilot chamber 98, and by action of the pilot pressure supplied to the second pilot chamber 98, the second piston 76 is lowered, and the third piston 78 together with the stem 94 are pressed in the direction of arrow $X_2$ through the ER fluid 86 which fills the interior of chamber 74.

As a result, the third piston 78 and stem 94 are displaced in the direction of arrow $X_2$ in opposition to the elastic force of the spring element 92, and the second diaphragm 80 which is coupled to the lower end of the stem 94 assumes a flexed condition toward the side of the fluid passage 38 (as shown in FIG. 1).

In this case, the coil member 84 is in a state in which voltage is not yet applied thereto, so that the viscosity of the ER fluid 86 filling the chamber 74 between the second and third pistons 76, 78 is not changed.

On the other hand, the pressurized fluid (compressed air) introduced from the first pilot port 64 is supplied to the first pilot chamber 48 of the ON/OFF valve 26, wherein the pilot pressure supplied to the first pilot chamber 48 causes displacement of the first piston 50 in the direction of arrow $X_1$ in opposition to the elastic force of spring elements 54a, 54b.

Accordingly, the first diaphragm 56 connected to the first piston 50 separates away from the seat 59 and the ON/OFF valve 26 assumes an ON state. At this time, coating liquid supplied from the coating liquid supply source 104 flows along the fluid passage 38 and coating liquid is made to drip onto the semiconductor wafer 106 via the nozzle 108 of the coating liquid drip apparatus 110. As a result, a coating film layer (not shown) having a desired film thickness is formed on the semiconductor wafer 106.

After coating the semiconductor wafer 106 with a desired amount of coating liquid via the coating liquid drip apparatus 110, the pilot pressure supplied to the first pilot chamber 48 of the ON/OFF valve 26 is reduced and the ON/OFF valve 26 assumes an OFF state.

Figure 2:
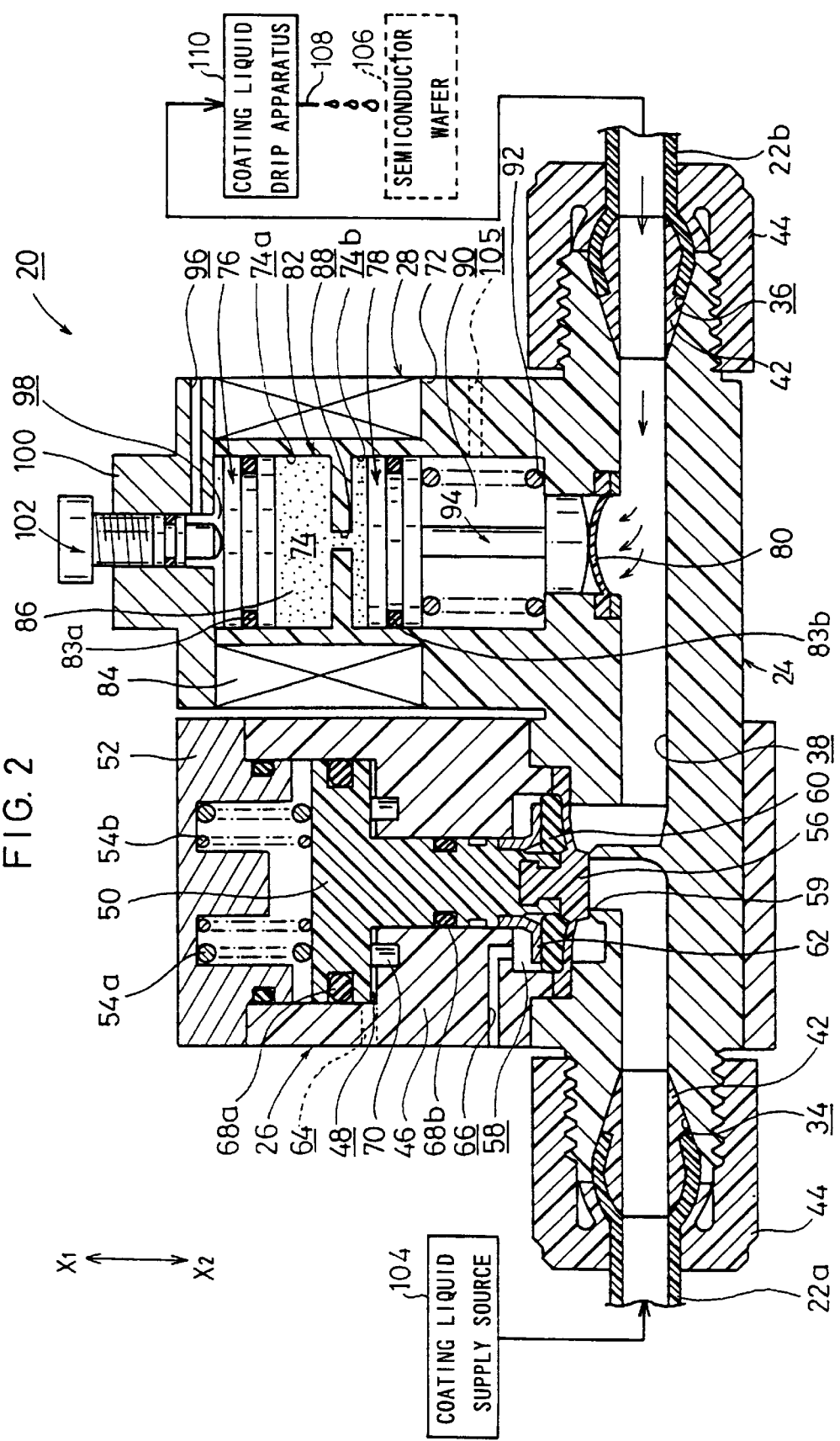
FIG. 2 is an explanatory view of an operation of the suck back valve shown in FIG. 1.
Figure 3:
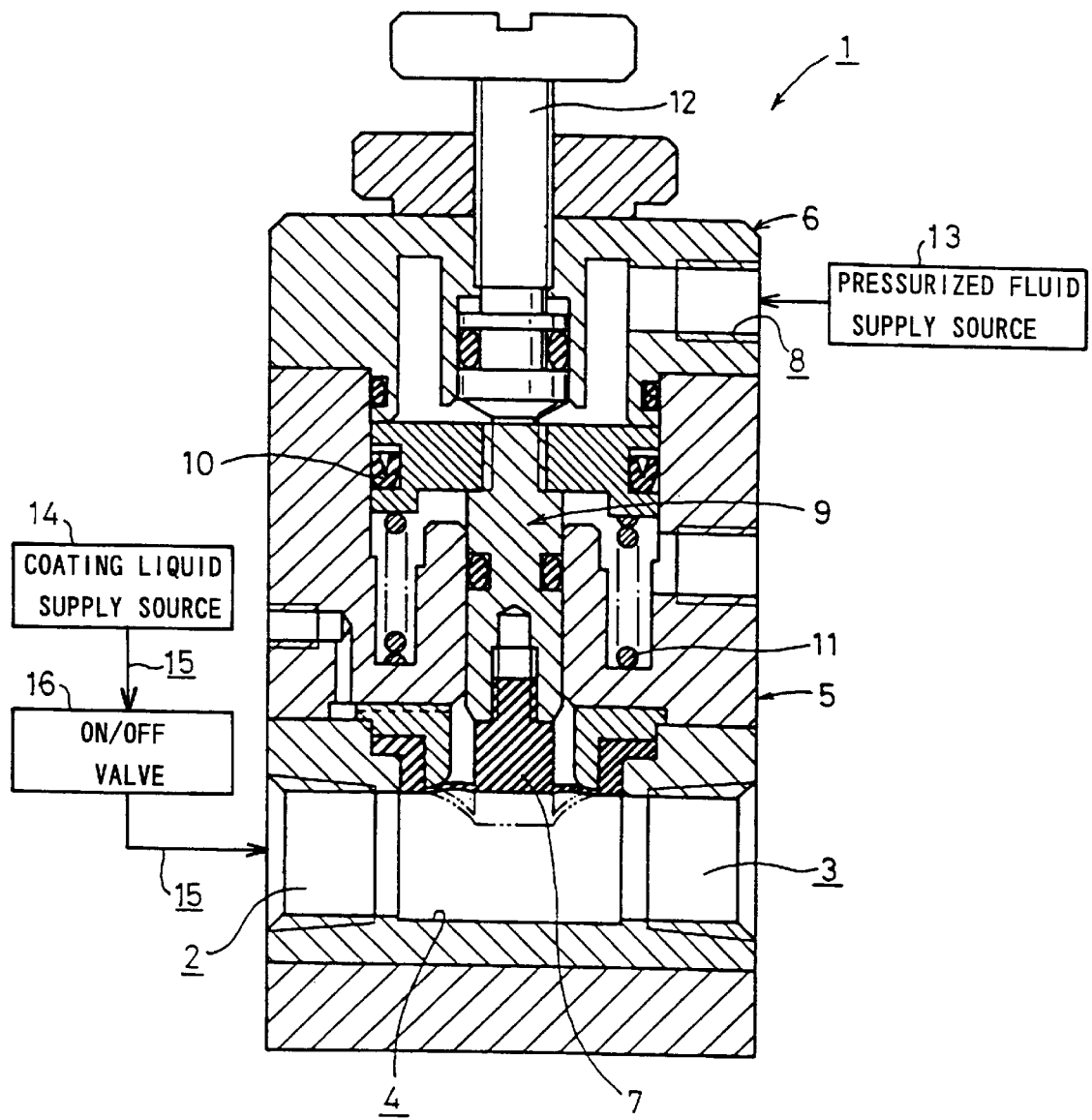
FIG. 3 is a vertical cross-sectional view of a suck back valve according to the conventional technique.

More specifically, by reducing the pilot pressure supplied to the first pilot chamber 48 of the ON/OFF valve 26, the first piston 50 displaces in the direction of arrow $X_2$ under action of the elastic force of spring elements 54a, 54b and the first diaphragm 56 becomes seated onto the seat 59 (see FIG. 2).

When the ON/OFF valve 26 assumes an OFF state, the supply of coating liquid to the semiconductor wafer 106 is halted by obstructing the fluid passage 38, and hence dripping of coating liquid onto the semiconductor wafer 106 from the nozzle 108 of the coating liquid drip apparatus 110 is halted. In this case, because coating liquid immediately preceding that which has been dripped onto the semiconductor wafer 106 remains inside the nozzle 108 of the coating liquid drip apparatus 110, there is a fear that unwanted dripping of such liquid may occur.

At that point, by reducing the pilot pressure which is supplied to the second pilot chamber 98 from the second pilot port 96 of the suck back mechanism 28, the third piston 78 and stem 94 are displaced in the direction of arrow $X_1$ under action of an elastic force of the spring element 92.

In this case, the third piston 78 and stem 94 are raised together in unison, and by flexure of the second diaphragm 80 upwardly (in the direction of arrow $X_1$) under the raising action of the stem 94, a negative pressure effect is generated, and a predetermined amount of coating liquid is sucked back along the direction of the arrows shown in FIG. 2.

As a result, by returning a predetermined amount of coating liquid which remains inside the nozzle 108 of the coating liquid drip apparatus 110 toward the side of the suck back valve 20, unwanted liquid dripping with respect to the semiconductor wafer 106 can be prevented.

When the third piston 78 and stem 94 are displaced in the direction of arrow $X_1$ under action of the elastic force of the spring element 92, the viscosity of the ER fluid 86 filled in the chamber 74 is caused to increase in proportion to an external electric field applied to the coil member 84 by energizing an electric source (not shown).

More specifically, by increasing the voltage applied to the coil member 84, the size of the external electric field generated by the coil member 84 is raised, and the viscosity of the ER fluid 86 changes in proportion to the size of the external electric field. The ER fluid 86 inside of the lower-side chamber 74b which has its viscosity changed in this manner, upon further passing through the constriction 88, the flow amount thereof is constricted as it is supplied into the upper-side chamber 74a.

Accordingly, by controlling the size of the external electric field generated by the coil member 84 under an energizing action of the electric source (not shown), the degree of viscosity of the ER fluid 86 is raised in proportion to the size of the external electric field. Yet in addition, by regulating the flow amount of the viscosity-raised ER fluid 86 which flows from the lower-side chamber 74b to the upper-side chamber 74a by means of the constriction 88, the raising speed (i.e. displacement speed) of the third piston 78 can be reduced in speed to a predetermined value.

As a result, mediated by the ER fluid 86, the second piston 76 is displaced in unison in the direction of arrow $X_1$, wherein kinetic energy, which is generated when the second piston 76 abuts against the stop 102 reaching an end position of its displacement, can be absorbed by the ER fluid 86. Accordingly, undesirable vibrations generated when the second piston 76 abuts against the stop 102 can be suppressed.

Further, by once again supplying pressurized fluid from the first pilot port 64 and second pilot port 96 under a switch-over action of unillustrated directional control valves, the ON/OFF valve 26 is placed in an ON state, and by downward displacement of the second diaphragm 80 to the condition shown in FIG. 1, dripping of coating liquid onto the semiconductor wafer 106 is reinitiated.

In the present embodiment, regulation of a displacement speed of the second diaphragm 80, which is displaced together with the third piston 78 as mediated by the displacement speed regulating device 82, is enabled by changing characteristics of the ER fluid 86. Further, by reducing the speed at which the third piston 78 is raised under a control action of the displacement speed regulating device 82, vibrations generated when the second piston 76 abuts against the stop 102 can be suppressed. As a result, unwanted liquid drip occurring at the nozzle 108 of the coating liquid drip apparatus 110 caused by such vibrations can be prevented.

Further, with the embodiment of the present invention, the coupling 24, ON/OFF valve 26 and suck back mechanism 28, respectively, are assembled integrally. Thus, in contradistinction to the conventional technique, pipe connecting operations between the suck back valve 20 and the ON/OFF valve 26 are rendered unnecessary, and installation space for the apparatus can be effectively utilized due to the fact that there is no need for dedicated space for attachment of the ON/OFF valve 26.

Furthermore, in the present embodiment, because the ON/OFF valve is formed integrally with the suck back mechanism 28, compared to the case of the prior art in which separately constructed devices are connected together, a reduction in the overall scale of the apparatus can be achieved.

Still further, a rise in response accuracy of the second diaphragm 80 operated by pilot pressure becomes possible, so that any coating liquid remaining inside the fluid passage 38 can be swiftly sucked back.

What is claimed is:

1. A suck back valve comprising:
    a coupling having a fluid passage, a first port formed on one end, and a second port formed on another end thereof;
    an ON/OFF valve for opening and closing said fluid passage through a first flexible member displaceable by a pilot pressure;
    a suck back mechanism for sucking a fluid inside said fluid passage under a negative pressure action of a second flexible member displaceable by an elastic force of a spring member; and
    a displacement speed regulating device for regulating the displacement speed of said second flexible member at a time of operation of said negative pressure action,
    wherein said displacement speed regulating device comprises a fluid filled in a chamber of a body, said fluid having a viscosity which changes corresponding to a size of an externally applied electric field, a coil member disposed in surrounding relation to said chamber for generating an external electric field in response to an applied voltage, and a constriction disposed at an intermediate position between an upper-side chamber and a lower-side chamber which together make up said chamber, for regulating a flow amount of fluid between said upper-side chamber and said lower-side chamber.

2. The suck back valve according to claim 1, further comprising a stop disposed in said suck back mechanism for regulating a displacement amount of said second flexible member, wherein said displacement speed regulating device absorbs kinetic energy generated when the displacement amount of said second flexible member is regulated by said stop.

3. The suck back valve according to claim 1, wherein said coupling, said suck back mechanism and said ON/OFF valve are assembled together as an integral unit.

4. The suck back valve according to claim 1, wherein each of said first flexible member and second flexible member, respectively, comprise diaphragms.

5. The suck back valve according to claim 1, wherein said displacement speed regulating device comprises a piston which is displaced along said upper-side chamber, another piston which is displaced along said lower-side chamber, and a stem having one end thereof of connected to said other piston and another end thereof coupled to said second flexible member.

6. The suck back valve according to claim 5, further comprising a pilot chamber disposed in said displacement speed regulating device for supplying a pilot pressure, wherein said piston, said other piston and said stem are displaced together in unison, in opposition to an elastic force of said spring, by pressing said piston under an action of said pilot pressure.

7. The suck back valve according to claim 1, wherein said fluid comprises an Electro-rheological Fluid.

* * * * *